United States Patent
Sasase

(10) Patent No.: US 9,652,183 B2
(45) Date of Patent: May 16, 2017

(54) IMAGE PROCESSING SYSTEM FOR IDENTIFYING IMAGE PROCESSING APPARATUSES USING A TERMINAL APPARATUS

(71) Applicant: Konica Minolta, Inc., Chiyoda-ku, Tokyo (JP)

(72) Inventor: Naoko Sasase, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/796,488

(22) Filed: Jul. 10, 2015

(65) Prior Publication Data

US 2016/0004485 A1    Jan. 7, 2016

Related U.S. Application Data

(62) Division of application No. 13/556,843, filed on Jul. 24, 2012, now abandoned.

(30) Foreign Application Priority Data

Jul. 26, 2011 (JP) .................................. 2011-163751

(51) Int. Cl.
G06F 3/12 (2006.01)
H04N 1/00 (2006.01)

(52) U.S. Cl.
CPC .......... *G06F 3/1204* (2013.01); *G06F 3/1226* (2013.01); *G06F 3/1231* (2013.01);
(Continued)

(58) Field of Classification Search
CPC .... G06F 3/1285; G06F 3/1231; G06F 3/1292; G06F 3/1226; H04N 2201/0075
See application file for complete search history.

(56) References Cited

U.S. PATENT DOCUMENTS 7,389,414 B2   6/2008  Hibino et al.
2007/0133843 A1   6/2007  Nakatani
(Continued)

FOREIGN PATENT DOCUMENTS

JP   2003-173251 A   6/2003
JP   2006-227731 A   8/2006
(Continued)

OTHER PUBLICATIONS

Office Action (Notification of Reasons for Refusal) issued on Nov. 12, 2013, by the Japanese Patent Office in corresponding Japanese Paten Application No. 2011-163751, and an English Translation of the Office Action. (7 pages).

*Primary Examiner* — Benjamin O Dulaney
(74) *Attorney, Agent, or Firm* — Buchanan Ingersoll & Rooney PC

(57) ABSTRACT

An image processing system comprises a portable terminal and multiple image processing apparatuses. The portable terminal comprises: a determining portion which determines a target identification operation proving the identify of a target image processing apparatus; a display which displays information about the target identification operation; and an instructing portion which instructs the multiple image processing apparatuses to return answer information. The multiple image processing apparatuses each comprises: a detector which detects that the operation corresponding to the target identification operation has been performed; and a transmitter which transmits to the portable terminal, the answer information and apparatus information. Then the portable terminal further comprises: a receiver which receives the answer information and the apparatus information; and an identifying portion which identifies the target image processing apparatus based on the answer information and the apparatus information.

19 Claims, 14 Drawing Sheets

(52) U.S. Cl.
CPC .......... *G06F 3/1232* (2013.01); *G06F 3/1285* (2013.01); *G06F 3/1292* (2013.01); *H04N 1/00209* (2013.01); *H04N 1/00244* (2013.01); *H04N 1/00413* (2013.01); *H04N 2201/0039* (2013.01); *H04N 2201/0044* (2013.01); *H04N 2201/0072* (2013.01); *H04N 2201/0075* (2013.01); *H04N 2201/0094* (2013.01)

(56) References Cited

U.S. PATENT DOCUMENTS

| | | | |
|---|---|---|---|
| 2007/0201081 A1* | 8/2007 | Murayama | H04L 67/36 358/1.15 |
| 2008/0130047 A1 | 6/2008 | Shudo | |
| 2009/0141303 A1* | 6/2009 | Azuchi | G06K 15/00 358/1.15 |
| 2010/0309504 A1 | 12/2010 | Partridge et al. | |
| 2011/0116129 A1 | 5/2011 | Onishi | |
| 2012/0011253 A1 | 1/2012 | Friedman et al. | |
| 2012/0089304 A1 | 4/2012 | Hamilton et al. | |
| 2012/0250065 A1 | 10/2012 | Partridge et al. | |

FOREIGN PATENT DOCUMENTS

| | | |
|---|---|---|
| JP | 2006-350588 A | 12/2006 |
| JP | 2007-086998 A | 4/2007 |
| JP | 2008-140192 | 6/2008 |
| JP | 2009-020602 A | 1/2009 |
| JP | 2009-042807 A | 2/2009 |
| JP | 2009-134423 A | 6/2009 |
| JP | 2010-262414 A | 11/2010 |
| JP | 2011-107892 A | 6/2011 |

\* cited by examiner

IMAGE PROCESSING SYSTEM FOR IDENTIFYING IMAGE PROCESSING APPARATUSES USING A TERMINAL APPARATUS

This application is a divisional of U.S. patent application Ser. No. 13/556,843, filed Jul. 24, 2012, and claims priority under 35 U.S.C. §119 to Japanese Patent Application No. 2011-163751 filed on Jul. 26, 2011, the entire disclosure of which is incorporated herein by reference in its entirety.

BACKGROUND OF THE INVENTION

Field of the Invention

The present invention relates to: an image processing system including a portable terminal and a plurality of image processing apparatuses all of which can be connected to each other via a network; a portable terminal preferably employed in this image processing system; an image processing apparatus identifying method for the image processing system; and a recording medium with a program to make a computer execute processing.

Description of the Related Art

The following description sets forth the inventor's knowledge of related art and problems therein and should not be construed as an admission of knowledge in the prior art.

There is a known technology allowing a user to transmit a job to an image processing apparatus via a network to execute, by operating a portable terminal such as a portable digital assistance.

In this technology, if there are multiple image processing apparatuses available which are connected to the network, the user needs to select one of the available image processing apparatuses to execute the job.

The user is allowed to obtain information of these available image processing apparatuses by searching the network and view them in list form on a display. However, it would not be easy to identify the image processing apparatuses promptly only by the information shown in the list, which are only model names and IP addresses. Specifically, when a user hopes to use his/her most convenient image processing apparatus for example in an unfamiliar place while being on a business trip, it would hardly be possible to identify it by examining every model name and IP address shown in the list, neither of which is familiar to him/her, too.

Suggested in Japanese Unexamined Patent Publication No. 2003-173251 is a technology which allows a communication device to identify an image forming apparatus most close to the communication device itself by searching with its own searching portion, when communicating with an image forming apparatus over a communication technology forming a relatively small communication area, Bluetooth for example. Using Bluetooth, the communication device is allowed to search only a small range by exchanging a BD address (Bluetooth device address) with other devices in the communication area.

Suggested in Japanese Unexamined Patent Publication No. 2006-350588 is a method which allows a matching server installed between a portable terminal and a section of image processing apparatuses to identify an image processing apparatus matching the portable terminal, by receiving identical information from both of them in a predetermined period of time.

Suggested in Japanese Unexamined Patent Publication No. 2007-86998 is a method which allows an image processing apparatus to: obtain a storage location of a target document by reading the target document displayed on a portable terminal by its own scanner or by receiving the target document over infrared communication; search a document storage server for the target document; and print it out.

Suggested in Japanese Unexamined Patent Publication No. 2009-042807 is a method which allows identifying an image processing apparatus at a location where a portable terminal exists, based on GPS data of the portable terminal, which is registered on a plurality of image processing apparatuses.

Suggested in Japanese Unexamined Patent Publication No. 2010-262414 is a method which allows identifying a printer by reading a barcode indicating a printer identification number, being fixed on the printer, by a portable terminal.

Suggested in Japanese Unexamined Patent Publication No. 2008-140192 is a method which allows identifying a default printer as described below. In that method, when a user is logged on a printer while the printer is in authentication mode, the printer obtains information of a portable terminal linked to him/her according to his/her login information and displays a "default printer setting button" on an operation panel of the printer itself. When the button is pressed by the user, the printer transmits an instruction to set a default printer to the portable terminal. Receiving this instruction therefrom, the portable terminal recognizes this printer as a default printer.

However, there are problems not having been solved yet with the technologies described in Japanese Unexamined Patent Publications No. 2003-173251, No. 2006-350588, No. 2007-86998, No. 2009-42807, and No. 2010-262414; that is, these technologies require an additional communication device using Bluetooth or infrared and a server storing printer identification numbers or require more complex configurations in order to make a matching pair of a portable terminal and an image processing apparatus and store registered GPS data of a portable terminal.

Also, there is a problem with the technology disclosed in Japanese Unexamined Patent Publication No. 2008-140192; that is, this technology requires an image processing apparatus store in advance connection information indicating users and their portable terminals because of the need to identify users by user authentication, meaning that users cannot use an image processing apparatus not storing the connection information, for example in an unfamiliar place while being on a business trip.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing system comprising a portable terminal and multiple image processing apparatuses all being capable of connecting to each other via a network, the portable terminal comprising:

a determining portion which determines a target identification operation proving the identify of a target image processing apparatus, so that the target image processing apparatus could be identified among the multiple image processing apparatuses;

a display which displays information about the target identification operation determined by the determining portion; and an instructing portion which instructs the multiple image processing apparatuses to return answer information notifying that an operation corresponding to the target identification operation has been performed, when this operation has been performed, the multiple image processing apparatuses each comprising:

a detector which detects that the operation corresponding to the target identification operation has been performed; and a transmitter which transmits to the portable terminal, the answer information and apparatus information proving the identity of the image processing apparatus itself, wherein the portable terminal further comprises:

a receiver which receives the answer information and the apparatus information from the image processing apparatus; and an identifying portion which identifies the target image processing apparatus based on the answer information and the apparatus information received by the receiver.

A second aspect of the present invention relates to an image processing system comprising a portable terminal and multiple image processing apparatuses all being capable of connecting to each other via a network, the portable terminal comprising:

an assigning portion which assigns different target identification display information objects proving the identities of the multiple image processing apparatuses, to the multiple image processing apparatuses; and a transmitter which transmits the different target identification display information objects assigned by the assigning portion, to the multiple image processing apparatuses;

the multiple image processing apparatuses each comprising:

a receiver which receives the target identification display information object from the portable terminal; and a display which displays the target identification display information object received by the receiver, wherein the portable terminal further comprises:

a target identifying portion which identifies the target image processing apparatus as the image processing apparatus having received from the portable terminal, the target identification display information object being identical with that entered by user on the portable terminal.

A third aspect of the present invention relates to a portable terminal being capable of connecting to multiple image processing apparatuses via a network, the portable terminal comprising:

a determining portion which determines a target identification operation proving the identify of a target image processing apparatus, so that the target image processing apparatus could be identified among the multiple image processing apparatuses;

a display which displays information about the target identification operation determined by the determining portion;

an instructing portion which instructs the multiple image processing apparatuses to return answer information notifying that an operation corresponding to the target identification operation has been performed, when this operation has been performed;

a receiver which receives the answer information and apparatus information proving the identities of the image processing apparatuses, from the image processing apparatuses; and an identifying portion which identifies the target image processing apparatus based on the answer information and the apparatus information received by the receiver.

A fourth aspect of the present invention relates to a portable terminal being capable of connecting to multiple image processing apparatuses via a network, the portable terminal comprising:

an assigning portion which assigns different target identification display information objects proving the identities of the multiple image processing apparatuses, to the multiple image processing apparatuses;

a transmitter which transmits the different target identification display information objects assigned by the assigning portion, to the multiple image processing apparatuses; and a target identifying portion which identifies the target image processing apparatus as the image processing apparatus having received from the portable terminal, the target identification display information object being identical with that entered by user on the portable terminal.

A fifth aspect of the present invention relates to an image processing apparatus identifying method being implemented by an image processing system comprising a portable terminal and multiple image processing apparatuses all being capable of connecting to each other via a network, the image processing apparatus identifying method comprising:

the steps of the portable terminal comprising:

determining a target identification operation proving the identify of a target image processing apparatus, so that the target image processing apparatus could be identified among the multiple image processing apparatuses;

displaying information about the target identification operation determined; and instructing the multiple image processing apparatuses to return answer information notifying that an operation corresponding to the target identification operation has been performed, when this operation has been performed, the steps of each of the multiple image processing apparatuses:

detecting that the operation corresponding to the target identification operation has been performed; and transmitting to the portable terminal, the answer information and apparatus information proving the identity of the image processing apparatus itself, wherein the steps of the portable terminal further comprises:

receiving the answer information and the apparatus information from the image processing apparatus; and identifying the target image processing apparatus based on the answer information and the apparatus information received.

A sixth aspect of the present invention relates to an image processing apparatus identifying method being implemented by an image processing system comprising a portable terminal and multiple image processing apparatuses all being capable of connecting to each other via a network, the image processing apparatus identifying method comprising:

the steps of the portable terminal comprising assigning different target identification display information objects proving the identities of the multiple image processing apparatuses, to the multiple image processing apparatuses; and transmitting the different target identification display information objects assigned, to the multiple image processing apparatuses;

the steps of each of the multiple image processing apparatuses comprising:

receiving the target identification display information object from the portable terminal; and displaying the received target identification display information object on a display, wherein the steps of the portable terminal further comprises:

identifying the target image processing apparatus as the image processing apparatus having received from the portable terminal, the target identification display information object being identical with that entered by user on the portable terminal.

A seventh aspect of the present invention relates to a non-transitory computer-readable recording medium with an image processing apparatus identifying program being stored thereon to make a computer of a portable terminal being capable of connecting to multiple image processing apparatuses via a network, execute:

determining a target identification operation proving the identify of a target image processing apparatus, so that the target image processing apparatus could be identified among the multiple image processing apparatuses;

displaying information about the target identification operation determined;

instructing the multiple image processing apparatuses to return answer information notifying that an operation corresponding to the target identification operation has been performed, when this operation has been performed;

receiving the answer information and the apparatus information from the image processing apparatus; and identifying the target image processing apparatus based on the answer information and the apparatus information received.

A eighth aspect of the present invention relates to a non-transitory computer-readable recording medium with an image processing apparatus identifying program being stored thereon to make a computer of a portable terminal being capable of connecting to multiple image processing apparatuses via a network, execute:

assigning different target identification display information objects proving the identities of the multiple image processing apparatuses, to the multiple image processing apparatuses;

transmitting the different target identification display information objects assigned by the assigning portion, to the multiple image processing apparatuses; and identifying the target image processing apparatus as the image processing apparatus having received from the portable terminal, the target identification display information object being identical with that entered by user on the portable terminal.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, these embodiments of the present invention will be described with reference to the accompanying drawings.

Figure 1:
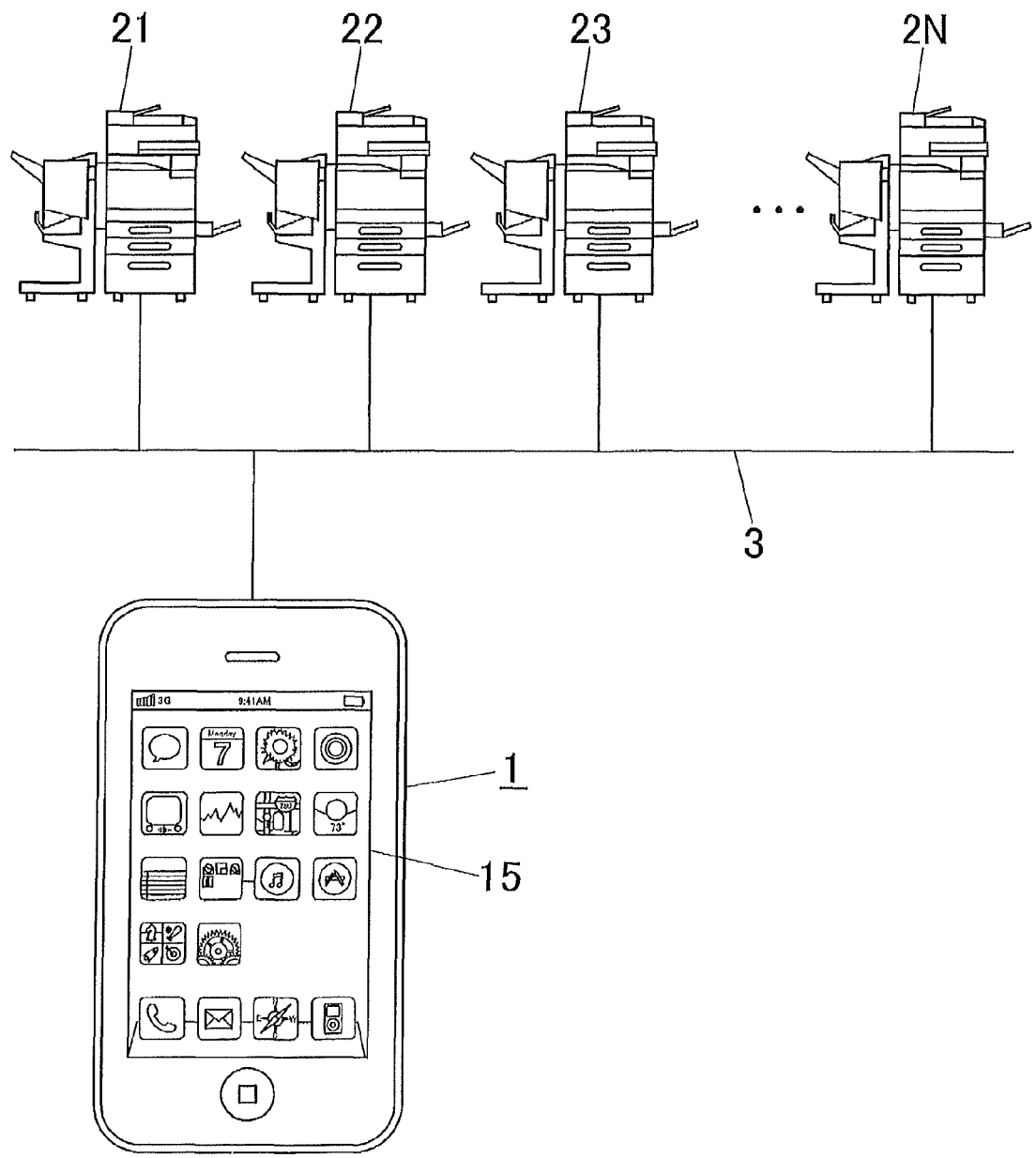
FIG. 1 is a block diagram illustrating a configuration of an image processing system according to one embodiment of the present invention.

FIG. 1 is a block diagram illustrating a configuration of an image processing system according to one embodiment of the present invention.

In this image processing system, there is a portable terminal 1 and multiple image processing apparatus 21, 22, 23 . . . 2N all of which are connected to each other via a network 3 such as LAN (Local Area Network).

Figure 2:
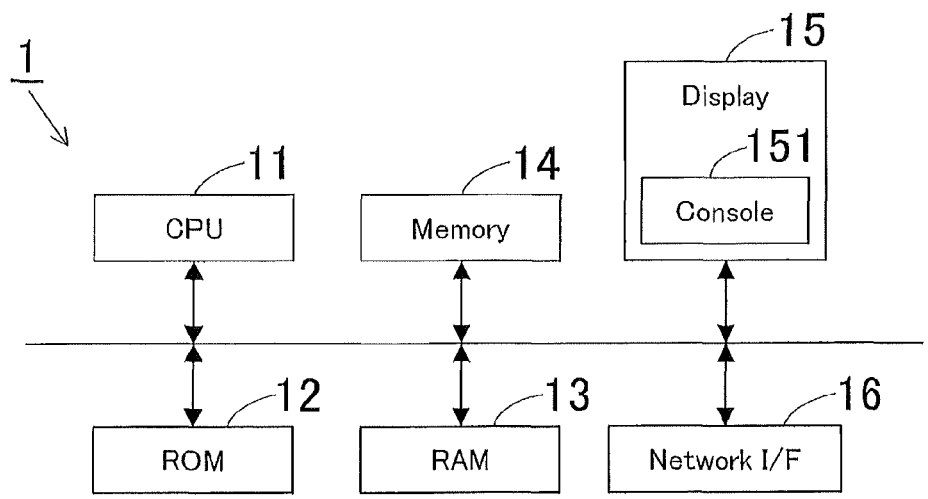
FIG. 2 is a block diagram illustrating a functional configuration of an portable terminal.

The portable terminal 1, which is constituted by a mobile phone, a portable information terminal, or the like, is a portable device with which a user can carry at all times. FIG. 2 is a block diagram illustrating a functional configuration of the portable terminal 1.

As illustrated in FIG. 2, the portable terminal 1 is provided with: a CPU 11, a ROM 12, a RAM 13, a memory 14, a display 15, and a network interface (network I/F) 16, and the like.

The CPU 11 fully controls the entire portable terminal 1 by executing programs stored on the ROM 12. Specifically in this embodiment, the CPU 11 determines a target identification operation proving the identify of a target apparatus for job execution which is any of the image processing apparatuses 21, 22 . . . 2N, assigns different target identification display information to the image processing apparatuses 21, 22 . . . 2N, respectively, and identifies a target image processing apparatus for job execution. These operations will be further described later.

The ROM 12 is a recording medium whish stores programs and other data for the CPU 11 to execute processing.

The ROM 213 is a recording medium which provides a work area for the CPU 11 to execute processing according to operation programs.

The memory 14, which is constituted by a hard disk drive or the like, stores various types of data. Specifically in this embodiment, the memory 14 also stores information about multiple target identification operations proving the identities of the image processing apparatuses 21, 22 . . . 2N and multiple target identification display information objects to be assigned to the image processing apparatuses 21, 22 . . . 2N, respectively.

The display 15, which is constituted by a liquid crystal display and the like, for example, displays various screens, data objects, messages, and the like. Specifically in this embodiment, the display 15 also functions as a console 151 because of a touch panel being further installed thereon, allowing the user to perform entry, give instructions, and conduct other operations via the screens.

The network interface (network I/F) 17 functions as a communicator which exchanges data with the image processing apparatuses 21, 22 . . . 2N and other external devices via the network 3. The portable terminal 1 also functions as a telephone, which is not shown in this figure.

Figure 3:
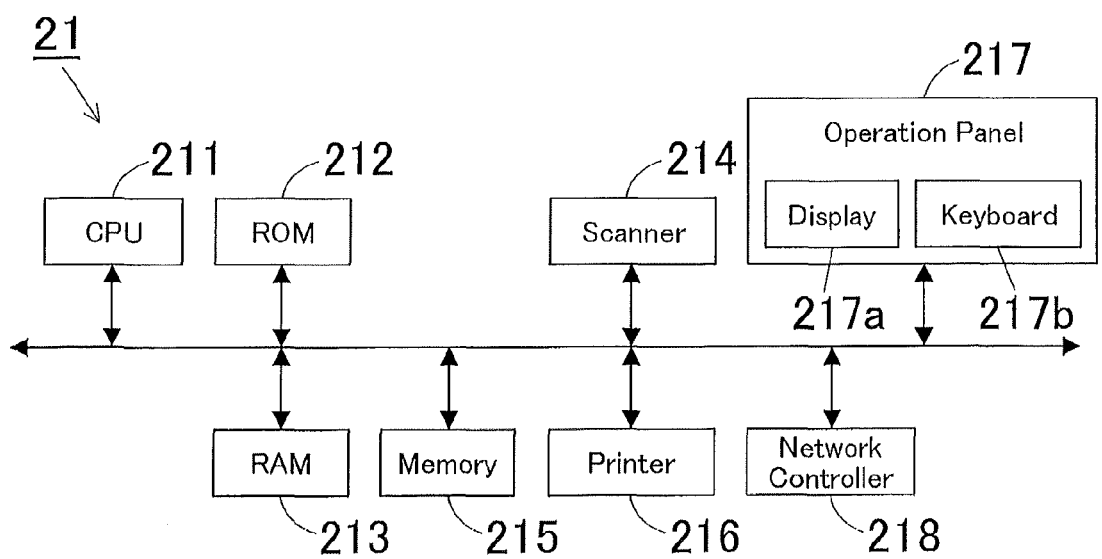
FIG. 3 is a block diagram illustrating a functional configuration of an image processing apparatus.

FIG. 3 is a block diagram illustrating a functional configuration of the image processing apparatuses 21, 22 . . . 2N. Hereinafter, the image processing apparatus 21 will be described on behalf of the image processing apparatuses 21, 22 . . . 2N all of which share a common configuration to each other.

In this embodiment, the image processing apparatus 21 is constituted by a multi-functional digital machine which is a MFP (Multi Function Peripheral) collectively having multiple functions such as copier function, printer function, scanner function, and facsimile function. And the image processing apparatus 21 is provided with: a CPU 211, a ROM 212, a RAM 213, a scanner 214, a memory 215, a printer 216, an operation panel 217, a network controller (NIC) 218, and the like.

Hereinafter, the image processing apparatuses also will be referred to as MFPs.

The CPU 211 allows performing basic functions such as copier function, printer function, scanner function, and facsimile function by fully controlling the entire image processing apparatus 21. When detecting that an operation corresponding to the target identification operation requested by the portable terminal 1 has been performed, the image processing apparatus 21 returns thereto answer information indicating the detection result and apparatus information proving the identity of the image processing apparatus 21 itself. Furthermore, the image processing apparatus 21 displays display information for apparatus identification received from the portable terminal 1, on the operation panel 217. The operations of the image processing apparatus 21 will be further described in detail later.

The ROM 212 is a memory which stores operation programs for the CPU 211.

The RAM 213 provides a work area for the CPU 211 to execute processing according to operation programs.

The scanner 214 reads images on a document placed on a document glass (not shown in this figure) to output image data.

The memory 215, which is constituted by a non-volatile recording device such as a hard disk drive (HDD), stores image data read out from a document by the scanner 214, data received from the portable terminal 1, and the like.

The printer 216 prints out image data read out from a document by the scanner 214, print data received from the portable terminal 2, and the like according to a specified mode.

The operation panel 217 is provided with: a display 217a such as a liquid crystal display with touch-panel functionality, displaying messages, operation screens, and the like; and a keyboard 217b with hardware keys such as a numerical keypad, a Start key, and a Stop key, serving for various entry operations.

The network controller 218 transmits and receives data by controlling communication with the portable terminal 1 and the other MFPs via the network.

Figure 4:
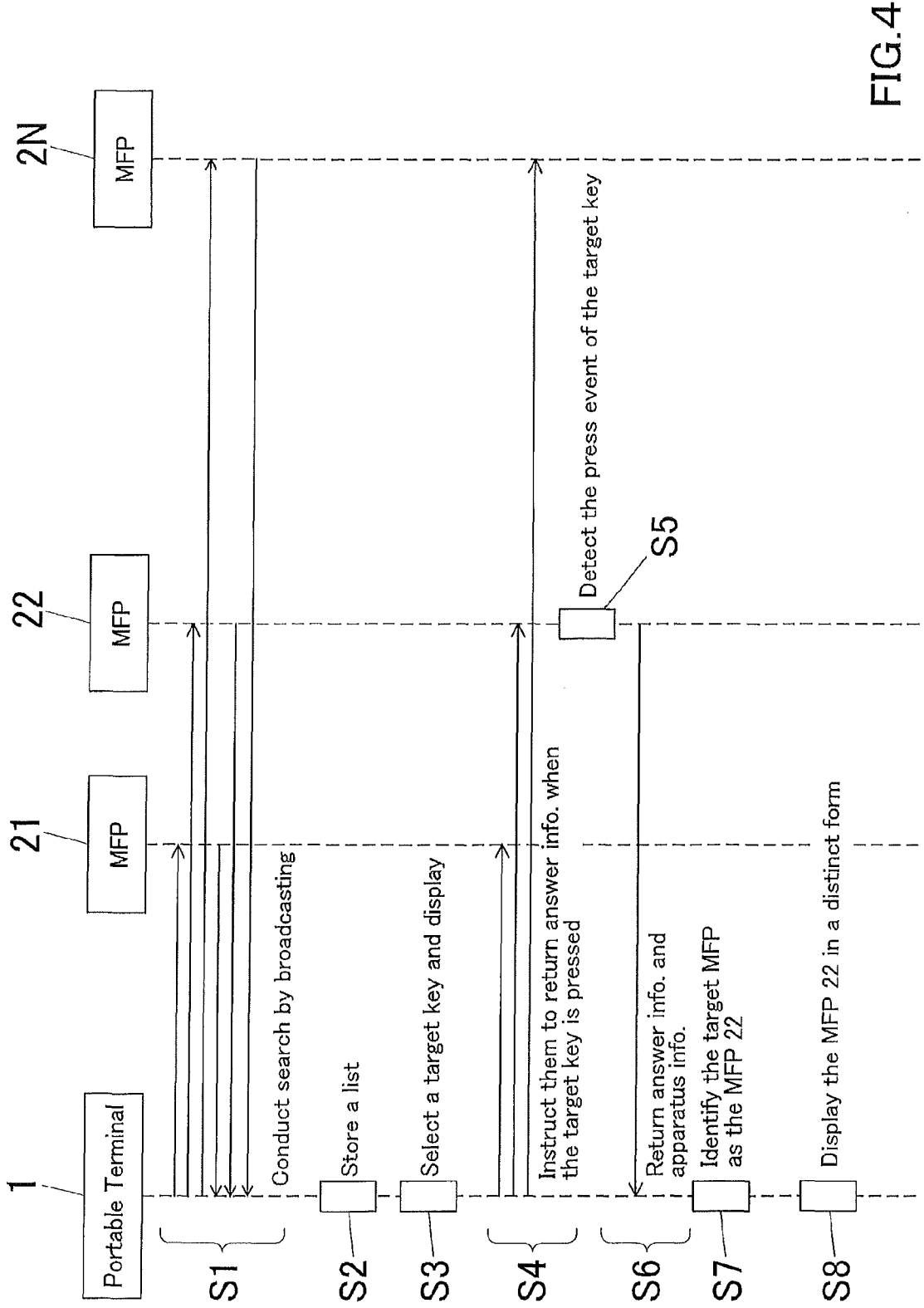
FIG. 4 is a sequence diagram illustrating the portable terminal's information exchange with the image processing apparatus.

Hereinafter, with the image processing system of FIG. 1, how the portable terminal 1 identifies a user's preferred MFPs among the MFPs 21, 22 . . . 2N when the user hopes to instruct the MFP to execute a print job by operating the portable terminal 1 will be described with reference to a sequence diagram in FIG. 4 illustrating information exchange among the portable terminal 1 and the MFPs 21, 22 . . . 2N.

When a user clicks on a Print button of the portable terminal 1, the portable terminal 1 searches the network 3 for available MFPs by broadcasting and obtains information about them (Step S1), and stores it in a list (Step S2).

Figures 5A, 5B:
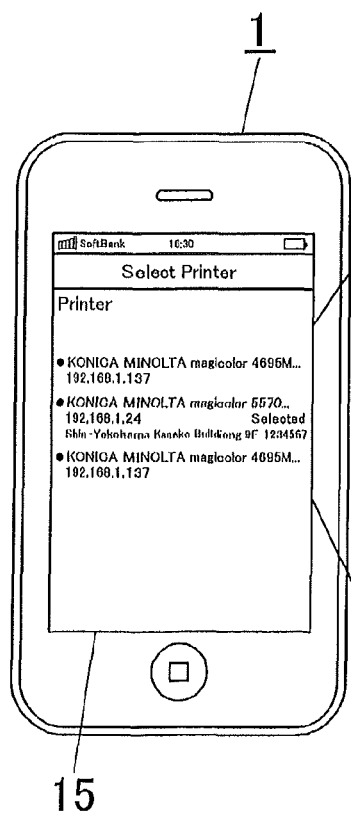
FIG. 5A is illustrates a display of the portable terminal, displaying a list of available image processing apparatuses.
FIG. 5B illustrates an enlarged image of the list displayed thereon.
Figures 7A, 7B:
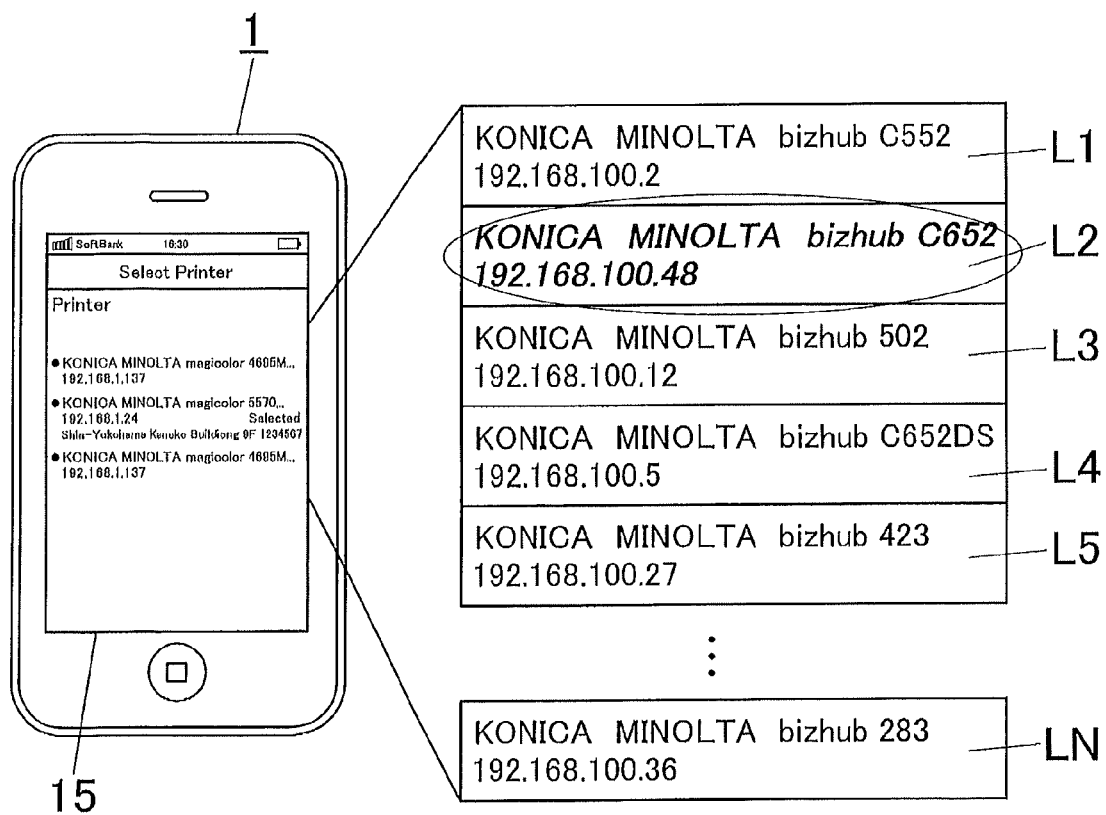
FIG. 7A illustrates the portable terminal with a display showing a list of available image processing apparatuses.
FIG. 7B illustrates a magnified view of the display showing one of available image processing apparatuses in a distinct form because of being selected by a user.

FIG. 5A is illustrates the display 15 of the portable terminal 1, displaying a list of available MFPs L1, L2 . . . LN; FIG. 5B illustrates an enlarged image of the list displayed thereon. The list, which is obtained by searching the network 3, is constituted by model names and IP addresses of the available MFPs as illustrated in FIGS. 5A and 5B, and therefore it would not be easy for the user to identify all the MFPs based on the list. FIG. 7A also illustrates the display 15 of the portable terminal 1, displaying a list of available MFPs L1, L2 . . . LN; FIG. 7B illustrates an enlarged image of an alternate list displayed thereon.

In this embodiment, the user is allowed to determine a target identification operation proving the identity of the target MFP and view about the target identification operation on the display 15 of the portable terminal 1 (Step S3).

Figure 6:
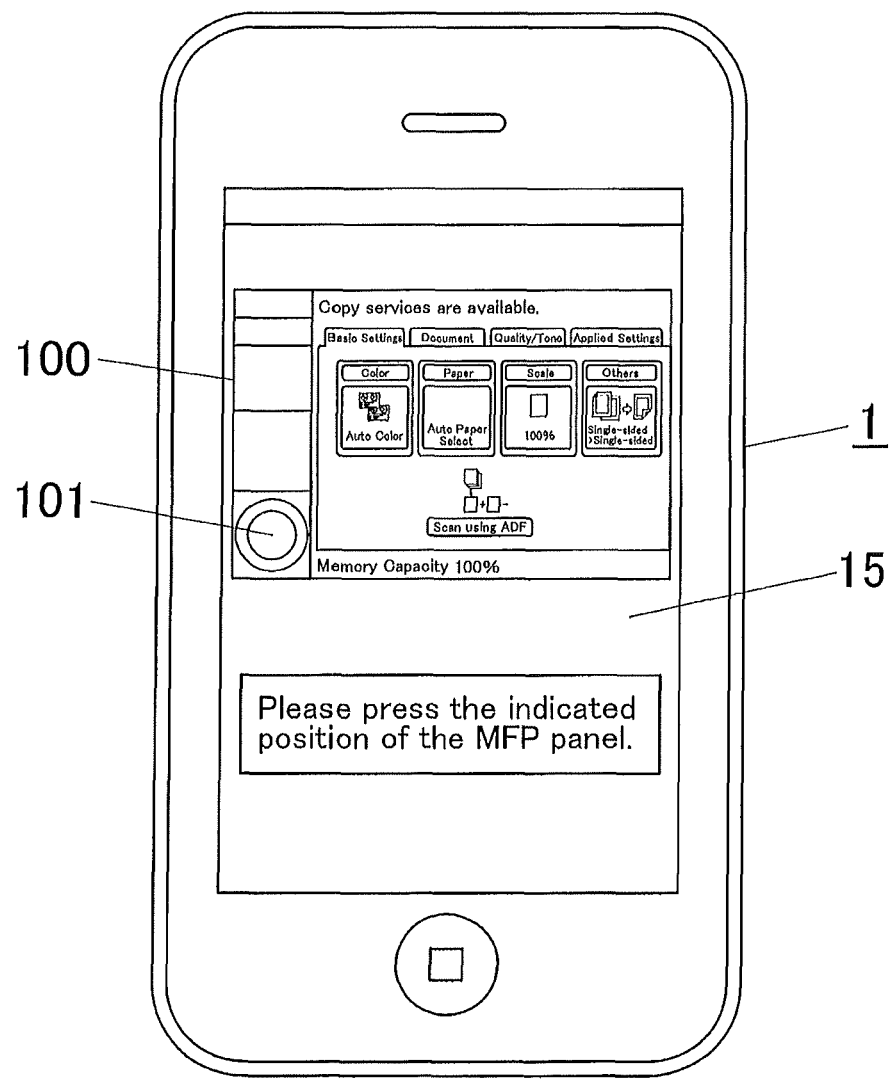
FIG. 6 illustrates the portable terminal with a display showing about a target identification operation.

In this embodiment, the target identification operation is, for example, an operation of pressing a predetermined position of the MFP 21, 22 . . . and 2N. Specifically, it is an operation of pressing a key 101 at the lower left corner of a default setting screen 100 on the display 217*a* of the operation panel 217 of the MFPs, which is reproduced on the display 15 of the portable terminal 1, as illustrated in FIG. 6. With this message, the user is allowed to understand easily that he/she only needs to press the key 101 at the lower left corner of the default setting screen 100 on the operation panel 217, in order to identify the target MFP.

Instead of a key on a screen displayed on the operation panel 271 as described above, the user may be allowed to press a button or area of the operation panel 271. Various operations including operations of pressing different positions are stored in advance on the memory 14 of the portable terminal 1, and one of them is randomly picked up and determined as the target identification operation. A target identification operation is performed only once, thus when there are multiple MFPs to be identified, different target identification operations are performed. When there are multiple users trying to identify a MFP at the same time, different target identification operations are determined by their portable terminals 1, thus when a user performs the target identification operation determined by his/her portable terminal 1, the target MFP returns answer information which will be later described, only to his/her portable terminal 1.

Back to the explanation of FIG. 4, when the user presses the key 101 in the default setting screen 100 on the display of the MFPs 21, 22 . . . 2N each of which is included in the list, the MFPs 21, 22 . . . 2N, in response to a request from their portable terminals 1, return thereto answer information notifying that the key 101 is pressed and apparatus information proving the identities of the MFPs 21, 22 . . . 2N themselves (Step S4). In this embodiment, the portable terminal 1 obtains information of all available MFPs connected to the network 3 by searching the network 3 and store the information in list form. Alternatively, the portable terminal 1 may not need to obtain the information by searching the network 3 and store on a memory. In such a case, the portable terminal 1 would need to transmit a request for answer information to all information devices connected to the network 3, possibly causing too much load to the network 3. It is therefore preferred to conduct MFP search in advance.

When the user presses the key 101 in the default setting screen 100 on the operation panel 217 of the target MFP (the MFP 22, for example), the MFP 22 detects the press event of the key 101 (Step S5). The MFP 22 then transmits its answer information and apparatus information to his/her portable terminal 1 (Step S6). The apparatus information corresponds to a model name and an IP address for example.

Based on the answer information and the apparatus information received, the portable terminal 1 identifies the target MFP as the MFP 22 (Step S7). Alternatively, as illustrated in the list of FIG. 7B, it is preferred that the portable terminal 1 makes information L2 of the MFP 22 appear in a distinct form, so that the user could promptly recognize the target MFP as the MFP 22 (Step S8). By describing "a distinct form", it should be understood that the information L may appear in a distinct form: for example, in bold font, in a specified color, and/or at a specified position such as the top of the list.

Figure 8:
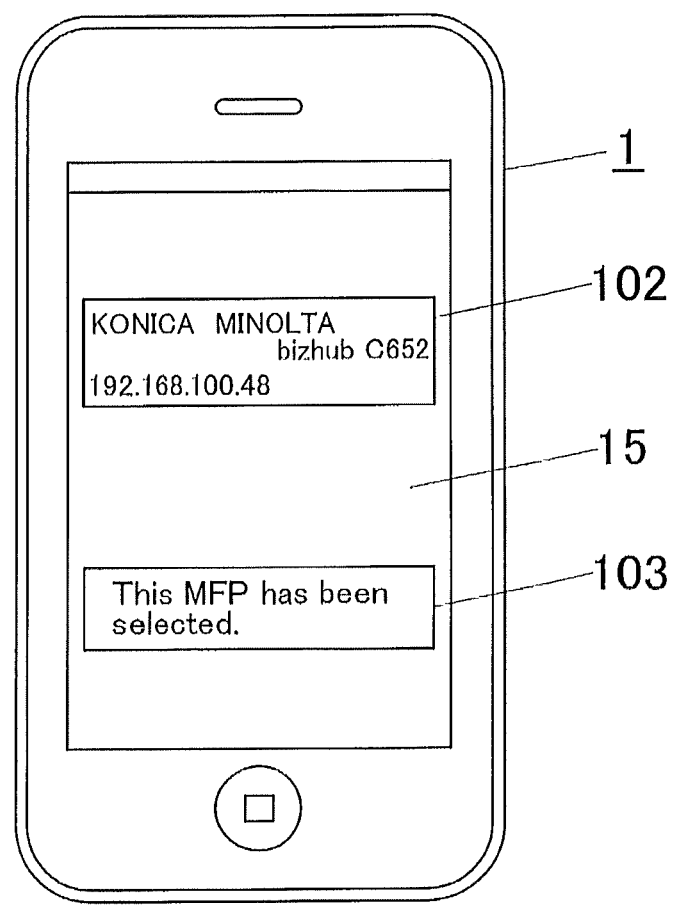
FIG. 8 illustrates the portable terminal with a display showing information of only the image processing apparatus selected by a user.

Further alternatively, as illustrated in FIG. 8, only the apparatus information 102 of the MFP 22 may appear on the display 15 simply along with a message 103 stating that this is the target one, so that the user could promptly recognize the target MFP as the MFP 22. It is preferred for the display 15 to indicate that the target MFP is identified as the MFP 22 so that the user could promptly recognize, which does not mean it is always necessary.

As described above in this embodiment, when a user presses a certain key such as the key 101 of the MFP 22, the MFP 22 transmits its answer information and apparatus information to the portable terminal 1, and the portable terminal 1 identifies the target MFP as the MFP 22 based on the information received. This would make it possible to identify the target MFP easily without its own IP address or model name, only by using a simple configuration of system not requiring an additional communication device using Bluetooth or infrared and a controller server. Furthermore, this embodiment does not require connection information about users and their portable terminals 1, allowing a user to execute a job by using MFPs not storing the connection information, for example in an unfamiliar place while being on a business trip.

Figure 9:
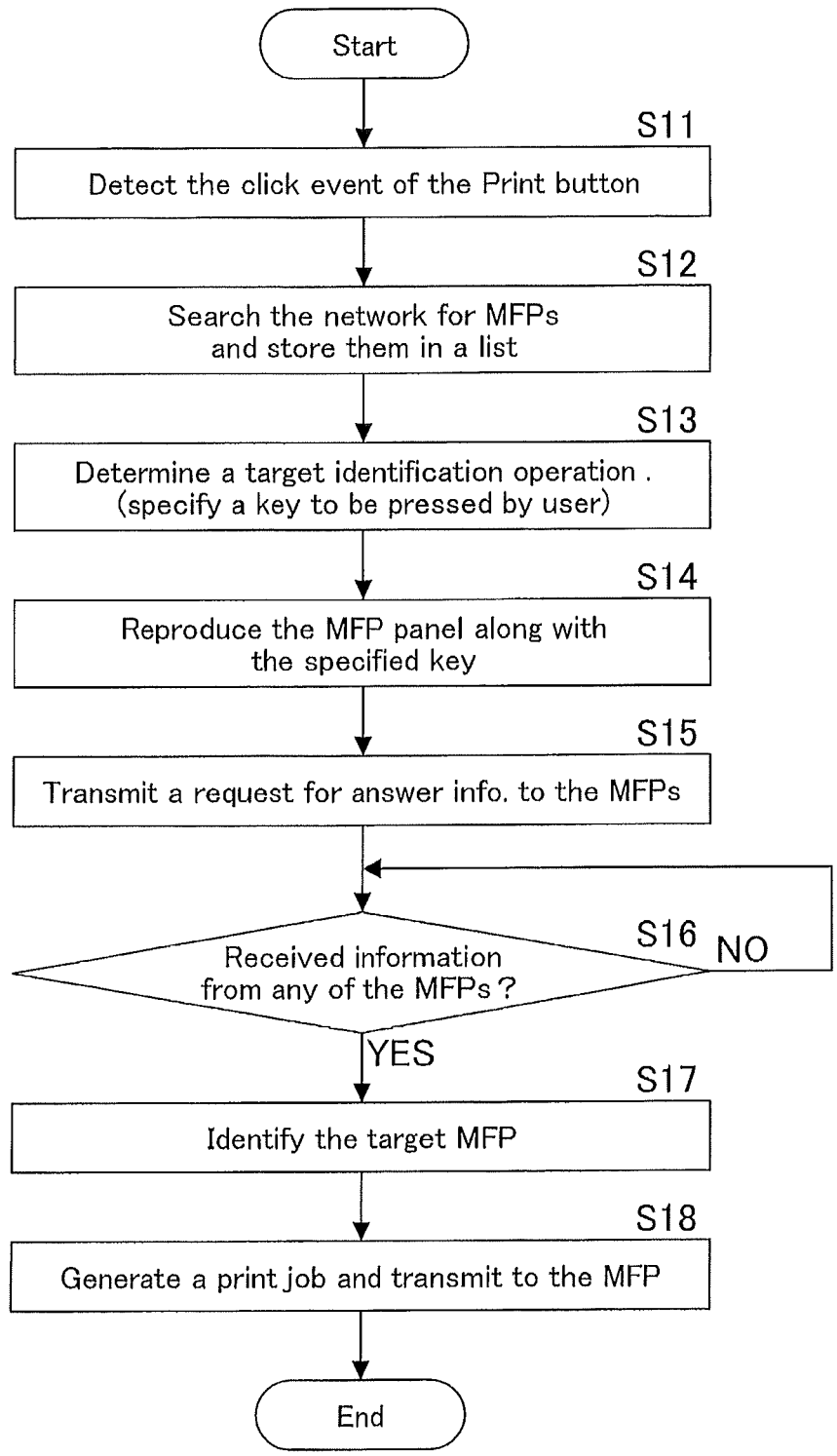
FIG. 9 is a flowchart representing a processing routine for the portable terminal to identify a user's preferred image processing apparatus when he/she hopes to instruct the image processing apparatus to execute a print job by operating the portable terminal.

FIG. 9, which relates to the embodiment described with reference to FIGS. 4 through 8, is a flowchart representing a processing routine for the portable terminal 1 to identify a user's preferred MFP among the MFPs 21, 22 . . . 2N when he/she hopes to instruct the MFP to execute a print job by operating the portable terminal 1. This processing routine is executed by the CPU 11 of the portable terminal 1 according to an operation program stored on a recording medium such as the ROM 12 of the same.

A user selects or displays a target document to print out then clicks on the Print button by operating the portable terminal 1. This instruction is accepted in Step S11, and the network is searched for available MFPs and a list of the available MFPs is stored in Step S12. Subsequently, a target identification operation is determined in Step S13. In this embodiment, a target key to be pressed by the user is determined.

Then in Step S14, a request for answer information is transmitted to the MFPs 21, 22 . . . 2N; in Step S15, the operation panel 217 of the MFPs is reproduced on the display 15 along with the target key.

Recognizing the target key reproduced on the display 15, the user goes to the target MFP to press the target key on the operation panel 217 thereof. Detecting the press event of the target key, the target MFP returns its answer information and apparatus information to the portable terminal 1.

The CPU11 of the portable terminal 1 waits in Step S16 (NO in Step S16) until answer information and apparatus information is received from any of the MFPs. When it is received (YES in Step S16), the target MFP is identified as the MFP having returned the information in Step S17. And in Step S18, a print job is generated and transmitted to the identified target MFP.

Figure 10:
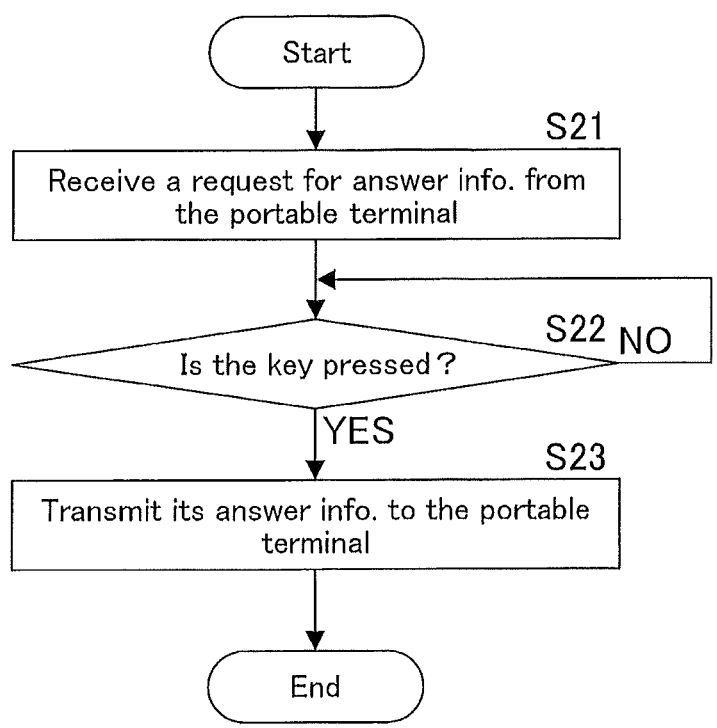
FIG. 10 is a flowchart representing a processing routine for the image processing apparatus to execute processing when a user presses a predetermined key.
Figure 11:
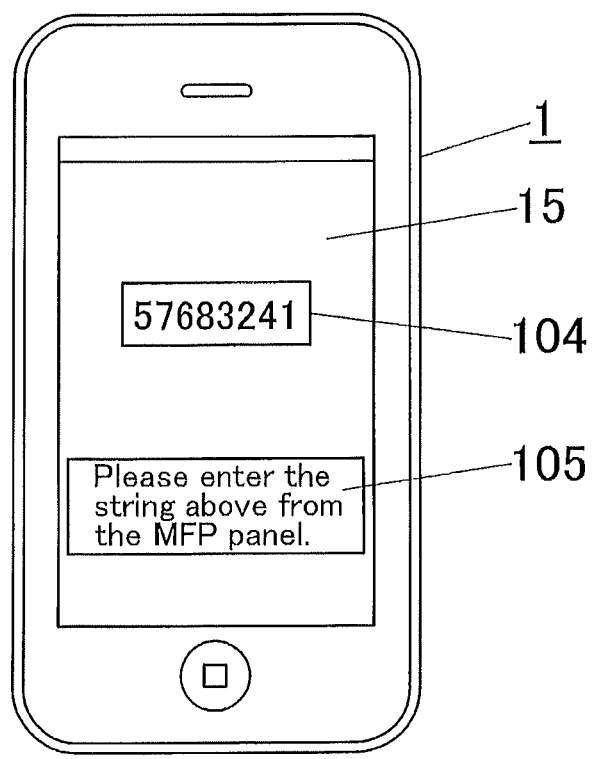
FIG. 11 is a view to explain another example of the target identification operation.

FIG. 10 is a flowchart representing a processing routine for the MFPs to execute processing when a user presses a predetermined key.

In Step S21, a request for answer information is received from the portable terminal 1. Then the processing routine waits in Step S22 (NO in Step S22) until the target key is pressed. When the target key is pressed (YES in Step S22), answer information and apparatus information is transmitted to the portable terminal 1 in Step S23.

In this embodiment described above, the portable terminal 1 determines an operation of pressing a predetermined position of the MFPs 21, 22 . . . 2N as the target identification operation to be performed by the user, for example. However, it should not be understood that the target identification operation is limited to this operation.

For example, the target identification operation may be an operation of entering a string such as a random series of single digits, on the MFPs. Such a string is generated by the CPU 11 based on unique information of the portable terminal 1, time, and the like. Since such a string is for one time use only, it is generated every time a target MFP needs to be identified.

The CPU 11 of the portable terminal 1 allows the display 15 to show the user about the target identification operation: a string 104 and a message 105 instructing to enter the indicated string via the operation panel 217 of the target MFP.

The portable terminal 1 instructs the MFPs 21, 22 . . . 2N, which are discovered by search and stored in the list, to return answer information notifying of the detection result and apparatus information proving the identity of the MFPs themselves when detecting that the string 104 is entered via the operation panel 217.

When detecting that the string 104 has been entered via the operation panel 217 by the user, the target MFP returns its answer information and apparatus information to the portable terminal 1.

Receiving the answer information and the apparatus information, the portable terminal 1 identifies the target MFP as the MFP having returned the information.

The target identification operation, which is an operation of entering a string here for example, can be explained with reference to: the sequence among the portable terminal 1 and the MFPs 21, 22 . . . 2; the operation of the portable terminal 1; the operation of the MFPs 21, 22 . . . 2N; and the operation panel of the MFPs which is reproduced on the display, in FIGS. 4 through 10 relating to the other example of the target identification operation.

Hereinafter, another embodiment of the present invention will be described with reference to FIGS. 12 through 15.

In this embodiment, the portable terminal 1 assigns different numbers to the MFPs 21, 22 . . . 2N as target identification display information in order to identify a target MFP by the number assigned thereto.

Hereinafter, how to identify a target MFP in this embodiment will be described with reference to FIG. 12 which is a sequence diagram illustrating information exchange among the portable terminal 1 and the MFPs 21, 22 . . . 2N.

When a user clicks on the Print button of the portable terminal 1, the portable terminal 1 searches the network 3 for available MFPs by broadcasting and obtains information about them (Step S31), and stores it in a list (Step S32).

Subsequently, the portable terminal 1 determines target identification numbers proving the identities of the MFPs 21, 22 . . . 2N and assigns the numbers to the MFPs 21, 22 . . . 2N, respectively. That is, the numbers are connected to the model names and IP addresses of the MFPs and all the information is stored (Step S33).

The portable terminal 1 transmits the numbers to the MFPs 21, 22 . . . 2N, respectively, along with an instruction to display the numbers (Step S34).

Receiving the number information along with the instruction, the MFPs 21, 22 . . . 2N display their numbers on the display 217a of the operation panel 217 (Step S35).

Meanwhile the portable terminal 1 displays a list of the numbers assigned to the MFPs 21, 22 . . . 2N, on the display 15 (Step S36).

The user goes to the target MFP (the MFP 22, for example) to recognize the number displayed on the operation panel 217 thereof. Then he/she finds and selects that number from the list displayed on the display 15 of the portable terminal 1. The portable terminal 1 then identifies the target MFP by the number selected by the user. That is, the portable terminal 1 identifies the target MFP as the MFP 22 whose number is identical with that selected by the user (Step S37). Subsequently, as illustrated in the list of FIG. 7B, the portable terminal 1 makes the information L2 of the MFP 22 appear in a distinct form according to need: for example in bold font and/or in a specified color, so that the user could promptly recognize the target MFP as the MFP 22 (Step S38).

Alternatively, as illustrated in FIG. 8, only the apparatus information 102 of the MFP 22 may appear on the display 15 simply along with the message 103 stating that this is the target one, so that the user could promptly recognize the target MFP as the MFP 22.

As described above in this embodiment, when a user enters the target identification number displayed on the operation panel 217 of the target MFP, on the portable terminal 1, the portable terminal 1 identifies the target MFP as the MFP whose target identification number is identical with that entered by the user. This would make it possible to identify the target MFP easily without its own IP address or model name, only by using a simple configuration of system not requiring an additional communication device using Bluetooth or infrared and a controller server. Furthermore, this embodiment does not require connection information about users and their portable terminals 1, allowing a user to execute a job by using MFPs not storing the connection information, for example in an unfamiliar place while being on a business trip.

In this embodiment, numbers are employed as the target identification display information; however, it should not be understood that the target identification display information is limited to numbers only. The target identification display information may be alphabets, symbols, figures, or the like. Every time a target MFP needs to be identified, such target identification display information is randomly generated and determined by the CPU 11 of the portable terminal 1 based on unique information of the portable terminal 1, time, and the like. Since such target identification display information is for one time use only, there would be different target identification display information objects when multiple target MFPs need to be identified.

Furthermore, in this embodiment, a list of different numbers assigned to the MFPs 21, 22 . . . 2N is displayed on the display 15 of the portable terminal 1 so that the user could select from the list, a number identical with the number displayed on the operation panel 217 of the target MFP. Instead of selecting the number from the list, the user may be allowed to manually enter the number on the portable terminal 1 and the portable terminal 1 may identify the target MFP by the number entered by the user.

Figure 12:
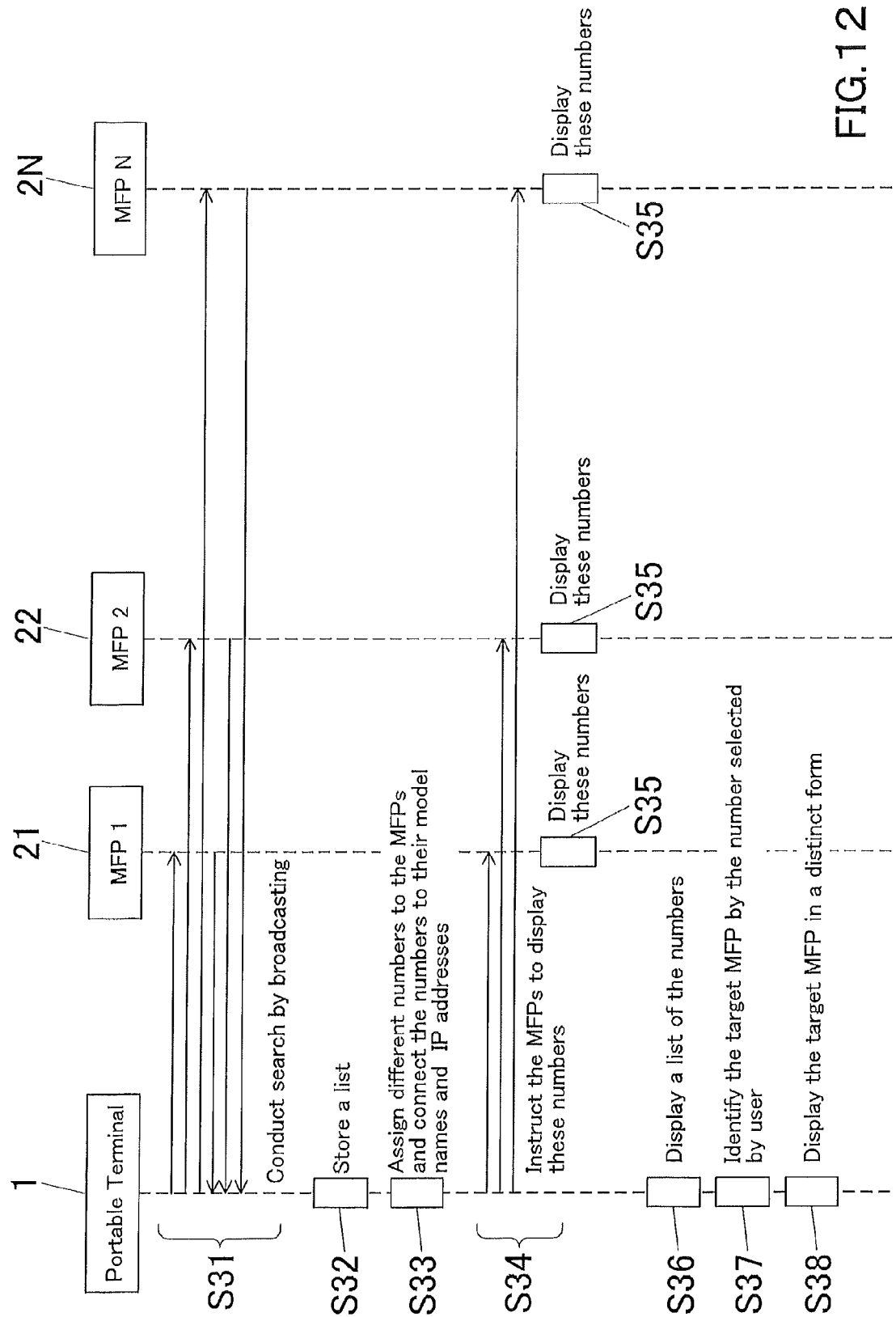
FIG. 12, which relates to another embodiment of the present invention, is a sequence diagram illustrating information exchange among the portable terminal and the image processing apparatus.
Figure 13:
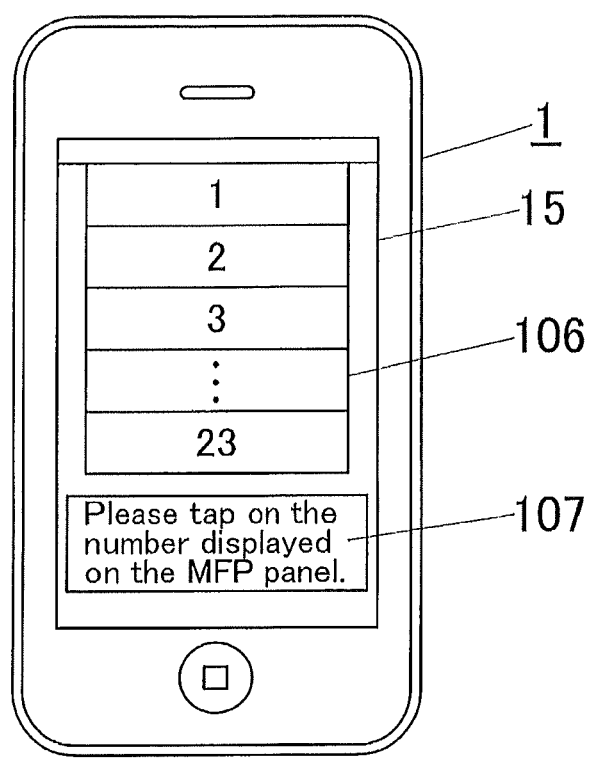
FIG. 13 is a view to explain an example of the portable terminal showing display information for apparatus identification.
Figure 14:
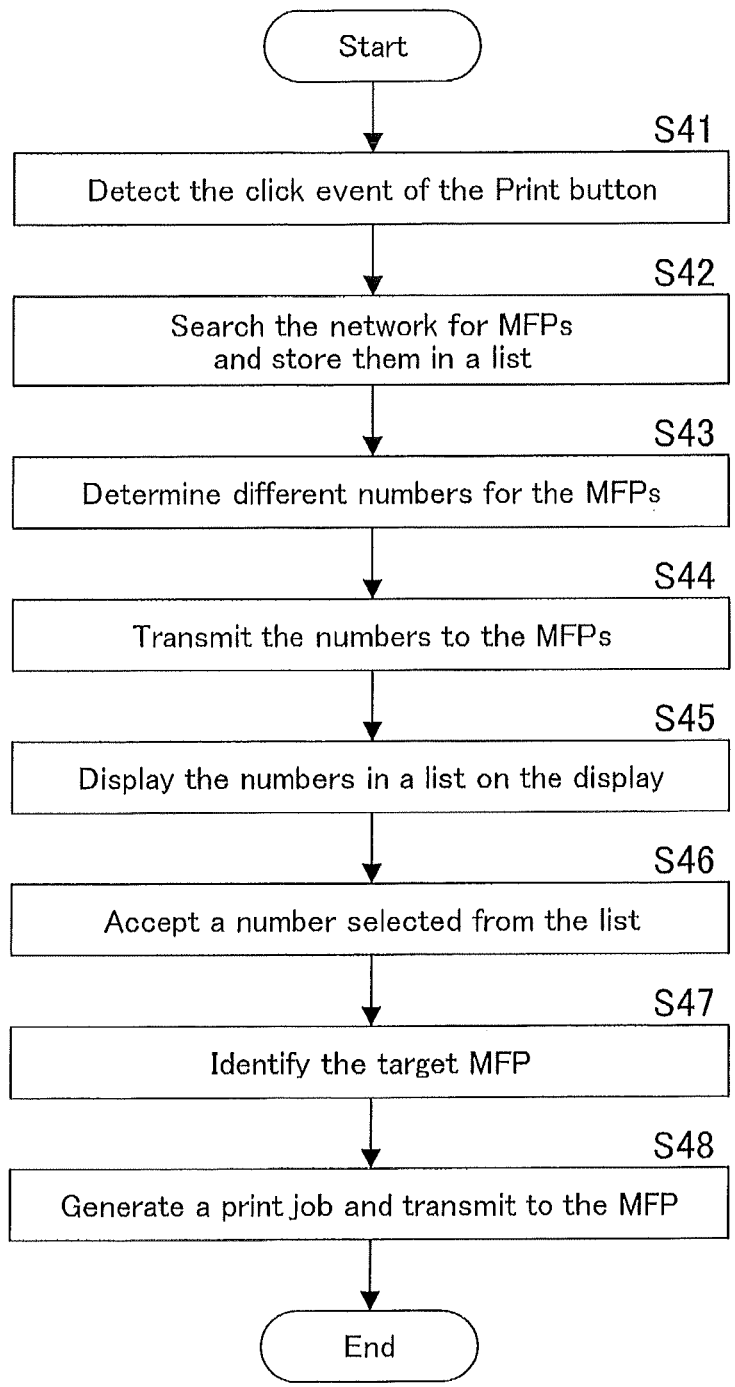
FIG. 14, which relates to the embodiment of FIG. 2, is a flowchart representing a processing routine for the portable terminal to identify a user's preferred image processing apparatus when he/she hopes to instruct the image processing apparatus to execute a print job by operating the portable terminal.

FIG. 14, which relates to the embodiment described with reference to FIGS. 12 and 13, is a flowchart representing a MFP identification operation for the portable terminal 1 to identify a user's preferred MFP among the MFPs 21, 22 . . . 2N when he/she hopes to instruct the MFP to execute a print job by operating the portable terminal 1. This processing routine is executed by the CPU 11 of the portable terminal 1 according to an operation program stored on a recording medium such as the ROM 12 of the same.

A user selects or displays a target document to print out then clicks on the Print button by operating the portable terminal 1. This instruction is accepted in Step S41, and the network is searched for available MFPs and a list of the available MFPs is stored in Step S42. In Step S43, different numbers are determined for the MFPs 21, 22 . . . 2N and assigned to the MFPs 21, 22 . . . 2N.

Information of the different numbers is transmitted to the MFPs 21, 22 . . . 2N in Step S44, and is displayed in a list on the display 15 in Step S45.

The user goes to the target MFP to recognize the number displayed on the operation panel 217 thereof. Then he/she finds and selects that number from the list displayed on the display 15 of the portable terminal 1. The CPU 11 of the portable terminal 1 accepts the selected number in Step S46, and identifies the target MFP as the MFP having this selected number in Step S47. Then in Step S48, a print job is generated and transmitted to the identified target MFP.

Figure 15:
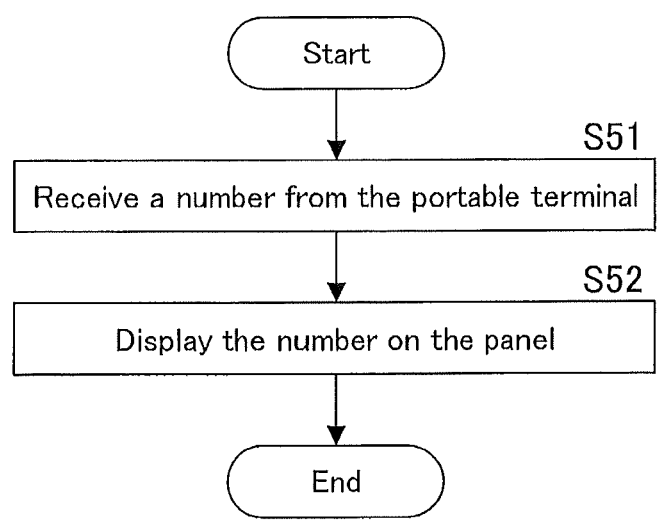
FIG. 15, which relates to the embodiment of FIG. 2, is a flowchart representing a processing routine for the image processing apparatus.

FIG. 15 is a flowchart representing a processing routine for the MFP which receives number information from the portable terminal 1.

In Step S51, number information is received from the portable terminal 1. Then the number is displayed on the display 217a of the operation panel 217 in Step S52.

The present invention having been described above may be applied to the following modes.

[1] An image processing system comprising a portable terminal and multiple image processing apparatuses all being capable of connecting to each other via a network, the portable terminal comprising:
 a selector which selects a target identification operation proving the identify of a target image processing apparatus, so that the target image processing apparatus could be identified among the multiple image processing apparatuses;
 a display which displays information about the target identification operation selected by the selector; and
 an instructing portion which instructs the multiple image processing apparatuses to return answer information notifying that an operation corresponding to the target identification operation has been performed, when this operation has been performed,
the multiple image processing apparatuses each comprising:
 a detector which detects that the operation corresponding to the target identification operation has been performed; and
 a transmitter which transmits to the portable terminal, the answer information and apparatus information proving the identity of the image processing apparatus itself,
wherein the portable terminal further comprises:
 a receiver which receives the answer information and the apparatus information from the image processing apparatus; and
 an identifying portion which identifies the target image processing apparatus based on the answer information and the apparatus information received by the receiver.

[2] The image processing system as recited in the aforementioned item [1], wherein the target identification operation selected by the selector of the portable terminal corresponds to an operation of pressing a predetermined position of the image processing apparatus.

[3] The image processing system as recited in the aforementioned item [1], wherein the target identification operation selected by the selector of the portable terminal corresponds to an operation of entering a predetermined string.

[4] An image processing system comprising a portable terminal and multiple image processing apparatuses all being capable of connecting to each other via a network, the portable terminal comprising:
 an assigning portion which assigns different target identification display information objects proving the identities of the multiple image processing apparatuses, to the multiple image processing apparatuses; and
 a transmitter which transmits the different target identification display information objects assigned by the assigning portion, to the multiple image processing apparatuses;
the multiple image processing apparatuses each comprising:
 a receiver which receives the target identification display information object from the portable terminal; and
 a display which displays the target identification display information object received by the receiver,
wherein the portable terminal further comprises:
 a target identifying portion which identifies the target image processing apparatus as the image processing apparatus having received from the portable terminal, the target identification display information object being identical with that entered by user on the portable terminal.

[5] The image processing system as recited in any of the aforementioned items [1] to [4], wherein the display of the portable terminal displays the target image processing apparatus identified by the target identifying portion, in a distinct form allowing user to recognize easily.

[6] A portable terminal being capable of connecting to multiple image processing apparatuses via a network, the portable terminal comprising:
 a selector which selects a target identification operation proving the identify of a target image processing apparatus, so that the target image processing apparatus could be identified among the multiple image processing apparatuses;
 a display which displays information about the target identification operation selected by the selector;
 an instructing portion which instructs the multiple image processing apparatuses to return answer information notifying that an operation corresponding to the target identification operation has been performed, when this operation has been performed;
 a receiver which receives the answer information and apparatus information proving the identities of the image processing apparatuses, from the image processing apparatuses; and
 an identifying portion which identifies the target image processing apparatus based on the answer information and the apparatus information received by the receiver.

[7] The portable terminal as recited in the aforementioned item [6], wherein the target identification operation selected by the selector corresponds to an operation of pressing a predetermined position of the image processing apparatus.

[8] The portable terminal as recited in the aforementioned item [6], wherein the target identification operation selected by the selector corresponds to an operation of entering a predetermined string on the portable terminal.

[9] A portable terminal being capable of connecting to multiple image processing apparatuses via a network, the portable terminal comprising:
 an assigning portion which assigns different target identification display information objects proving the identities of the multiple image processing apparatuses, to the multiple image processing apparatuses;
 a transmitter which transmits the different target identification display information objects assigned by the assigning portion, to the multiple image processing apparatuses; and a target identifying portion which identifies the target image processing apparatus as the image processing apparatus having received from the portable terminal, the target identification display information object being identical with that entered by user on the portable terminal.

[10] The portable terminal as recited in any of the aforementioned items [6] to [9], wherein the display of the portable terminal displays the target image processing apparatus identified by the target identifying portion, in a distinct form allowing user to recognize easily.

[11] An image processing apparatus identifying method being implemented by an image processing system comprising a portable terminal and multiple image processing apparatuses all being capable of connecting to each other via a network, the image processing apparatus identifying method comprising:

the steps of the portable terminal comprising:
  selecting a target identification operation proving the identify of a target image processing apparatus, so that the target image processing apparatus could be identified among the multiple image processing apparatuses;
  displaying information about the target identification operation selected; and
  instructing the multiple image processing apparatuses to return answer information notifying that an operation corresponding to the target identification operation has been performed, when this operation has been performed, the steps of each of the multiple image processing apparatuses:
  detecting that the operation corresponding to the target identification operation has been performed; and
  transmitting to the portable terminal, the answer information and apparatus information proving the identity of the image processing apparatus itself, wherein the steps of the portable terminal further comprises:
  receiving the answer information and the apparatus information from the image processing apparatus; and
  identifying the target image processing apparatus based on the answer information and the apparatus information received.

[12] An image processing apparatus identifying method being implemented by an image processing system comprising a portable terminal and multiple image processing apparatuses all being capable of connecting to each other via a network, the image processing apparatus identifying method comprising:

the steps of the portable terminal comprising
  assigning different target identification display information objects proving the identities of the multiple image processing apparatuses, to the multiple image processing apparatuses; and
  transmitting the different target identification display information objects assigned, to the multiple image processing apparatuses;

the steps of each of the multiple image processing apparatuses comprising:
  receiving the target identification display information object from the portable terminal; and
  displaying the received target identification display information object on a display, wherein the steps of the portable terminal further comprises:
  identifying the target image processing apparatus as the image processing apparatus having received from the portable terminal, the target identification display information object being identical with that entered by user on the portable terminal.

[13] A non-transitory computer-readable recording medium with an image processing apparatus identifying program being stored thereon to make a computer of a portable terminal being capable of connecting to multiple image processing apparatuses via a network, execute:
  selecting a target identification operation proving the identify of a target image processing apparatus, so that the target image processing apparatus could be identified among the multiple image processing apparatuses;
  displaying information about the target identification operation selected;
  instructing the multiple image processing apparatuses to return answer information notifying that an operation corresponding to the target identification operation has been performed, when this operation has been performed;
  receiving the answer information and the apparatus information from the image processing apparatus; and
  identifying the target image processing apparatus based on the answer information and the apparatus information received.

[14] The non-transitory computer-readable recording medium with the image processing apparatus identifying program being stored thereon as recited in the aforementioned item [13], wherein the selected target identification operation corresponds to an operation of pressing a predetermined position of the image processing apparatus.

[15] The non-transitory computer-readable recording medium with the image processing apparatus identifying program being stored thereon as recited in the aforementioned item [13], wherein the selected target identification operation corresponds to an operation of entering a predetermined string on the portable terminal.

[16] A non-transitory computer-readable recording medium with an image processing apparatus identifying program being stored thereon to make a computer of a portable terminal being capable of connecting to multiple image processing apparatuses via a network, execute:
  assigning different target identification display information objects proving the identities of the multiple image processing apparatuses, to the multiple image processing apparatuses;
  transmitting the different target identification display information objects assigned by the assigning portion, to the multiple image processing apparatuses; and
  identifying the target image processing apparatus as the image processing apparatus having received from the portable terminal, the target identification display information object being identical with that entered by user on the portable terminal.

[17] The non-transitory computer-readable recording medium with the image processing apparatus identifying program being stored thereon as recited in any of the aforementioned items [13] to [16], wherein the identified target image processing apparatus is displayed on the display of the portable terminal, in a distinct form allowing user to recognize easily.

According to the invention in the aforementioned item [1], the portable terminal selects a target identification operation proving the identify of a target image processing apparatus in order to identify the target image processing apparatus among multiple image processing apparatuses, displays information of the selected target identification operation on the display, and instructs the multiple image processing apparatuses to return answer information notifying that an operation corresponding to the target identification operation has been performed when they detect that the operation has been performed.

With reference to the information about the target identification operation on the display of the portable terminal, the user performs an operation corresponding to the target identification operation using the target image processing apparatus. Detecting that the operation has been performed, the target image processing apparatus returns its answer information and apparatus information proving the identity of the image processing apparatus itself to the portable terminal.

The portable terminal receives therefrom the answer information and the apparatus information and identifies the target image processing apparatuses based on the answer information and the apparatus information received.

In other words, when the user performs an operation corresponding to the target identification operation using a target image processing apparatus, the target image processing apparatus returns its answer information and apparatus information to the portable terminal and the portable terminal identifies the target image processing apparatus as an image processing apparatus that returns thereto the information. This makes it possible to identify a target image processing apparatus easily without its own IP address or model name. There is no need for an additional communication device using Bluetooth or infrared and a controller server, making this configuration very simple. Also, connection information indicating users and their portable terminals is not required, allowing the user to execute a job using an image processing apparatus not storing the connection information, for example in an unfamiliar environment while being on a business trip.

According to the invention in the aforementioned item [2], the target identification operation selected by the selector of the portable terminal corresponds to an operation of pressing a predetermined position of the image processing apparatus. Therefore, when the user presses a predetermined position of the target image processing apparatus, the portable terminal identifies the target image processing apparatus as an image processing apparatus that returns thereto its information.

According to the invention in the aforementioned item [3], the target identification operation selected by the selector of the portable terminal corresponds to an operation of entering a predetermined string. Therefore, when the user enters a predetermined string on the target image processing apparatus, the portable terminal identifies the target image processing apparatus as an image processing apparatus that returns thereto its information.

According to the invention in the aforementioned item [4], the portable terminal assigns different target identification display information objects proving the identities of multiple image processing apparatuses, to the multiple image processing apparatuses, then transmits the different target identification display information objects to the multiple image processing apparatuses, respectively. Each of the image processing apparatuses displays the received target identification display information object on the display and a user recognizes on the display. When the user enters information identical with the target identification display information object, the portable terminal identifies the target image processing apparatus as an image processing apparatus that returns thereto the information entered by the user.

As described above, when a user enters information identical with a target identification display information object displayed on the target image processing apparatus, on the portable terminal, the portable terminal identifies the target image processing apparatus as an image processing apparatus that returns thereto the information entered by the user. This makes it possible to identify a target image processing apparatus easily without its own IP address or model name. There is no need for an additional communication device using Bluetooth or infrared and a controller server, making this configuration very simple. Also, connection information indicating users and their portable terminals is not required, allowing the user to execute a job using an image processing apparatus not storing the connection information, for example in an unfamiliar environment while being on a business trip.

According to the invention in the aforementioned item [5], the portable terminal allows the user to easily recognize the identified target image processing apparatus.

According to the invention in the aforementioned item [6], when the user performs an operation corresponding to the target identification operation using a target image processing apparatus, the target image processing apparatus returns its answer information and apparatus information to the portable terminal and the portable terminal identifies the target image processing apparatus as an image processing apparatus that returns thereto the information. This makes it possible to identify a target image processing apparatus easily without its own IP address or model name. There is no need for an additional communication device using Bluetooth or infrared and a controller server, making this configuration very simple. Also, connection information indicating users and their portable terminals is not required, allowing the user to execute a job using an image processing apparatus not storing the connection information, for example in an unfamiliar environment while being on a business trip.

According to the invention in the aforementioned item [7], when the user presses a predetermined position of the target image processing apparatus, the portable terminal identifies the target image processing apparatus as an image processing apparatus that returns thereto its information.

According to the invention in the aforementioned item [8], when the user enters a predetermined string on the target image processing apparatus, the portable terminal identifies the target image processing apparatus as an image processing apparatus that returns thereto its information.

According to the invention in the aforementioned item [9], when a user enters information identical with a target identification display information object displayed on the target image processing apparatus, on the portable terminal, the portable terminal identifies the target image processing apparatus as an image processing apparatus that returns thereto the information entered by the user. This makes it possible to identify a target image processing apparatus easily without its own IP address or model name. There is no need for an additional communication device using Bluetooth or infrared and a controller server, making this configuration very simple. Also, connection information indicating users and their portable terminals is not required, allowing the user to execute a job using an image processing apparatus not storing the connection information, for example in an unfamiliar environment while being on a business trip.

According to the invention in the aforementioned item [10], the portable terminal allows the user to easily recognize the identified target image processing apparatus.

According to the inventions in the aforementioned items [11] and [12], a target image processing apparatus can be identified easily without its own IP address or model name. There is no need for an additional communication device using Bluetooth or infrared and a controller server, making this configuration very simple. Also, connection information indicating users and their portable terminals is not required, allowing the user to execute a job using an image processing apparatus not storing the connection information, for example in an unfamiliar environment while being on a business trip.

According to the invention in the aforementioned item [13], a computer of the portable terminal capable of connecting to the multiple image processing apparatuses via a network is allowed to: select a target identification operation proving the identify of a target image processing apparatus in order to identify the target image processing apparatus among the multiple image processing apparatuses; display information of the selected target identification operation on the display; instruct the multiple image processing apparatuses to return answer information notifying that an operation corresponding to the target identification operation has been performed when they detect that the operation has been performed; receive from any of the image processing apparatuses, the answer information and apparatus information proving the identity of the image processing apparatus itself; and identifies the target image processing apparatus based on the answer information and the apparatus information received.

According to the invention in the aforementioned item [14], when the user presses a predetermined position of the target image processing apparatus, the computer of the portable terminal is allowed to identify the target image processing apparatus as an image processing apparatus that returns thereto its information.

According to the invention in the aforementioned item [15], when the user enters a predetermined string on the target image processing apparatus, the computer of the portable terminal is allowed to identify the target image processing apparatus as an image processing apparatus that returns thereto its information.

According to the invention in the aforementioned item [16], a computer of the portable terminal capable of connecting to the multiple image processing apparatuses via a network is allowed to: assign different target identification display information objects proving the identities of the multiple image processing apparatuses, to the multiple image processing apparatuses; transmit the different target identification display information objects to the multiple image processing apparatuses, respectively; and identify the target image processing apparatus as an image processing apparatus that returns thereto the information entered by the user.

According to the invention in the aforementioned item [17], the computer of the portable terminal is allowed to display the identified target image processing apparatus on the display, in a distinct form allowing user to recognize easily While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising a terminal apparatus and multiple image processing apparatuses all being capable of connecting to each other via a network,
   the terminal apparatus comprising:
   a hardware processor configured to select a target identification operation proving the identity of a target image processing apparatus, so that the target image processing apparatus could be identified among the multiple image processing apparatuses, the target identification operation being selected out of a plurality of target identification operations, each of the plurality of target identification operations proving the identity of the target processing apparatus;
   a display which displays information about the target identification operation determined by the hardware processor; and
   the hardware processor being configured to instruct the multiple image processing apparatuses to return answer information notifying that an operation corresponding to the target identification operation has been performed when they detect that this operation has been performed,
   the multiple image processing apparatuses each comprising:
   a detector which detects that the operation corresponding to the target identification operation has been performed; and
   a transmitter which transmits to the terminal apparatus, the answer information and apparatus information proving the identity of the image processing apparatus itself, wherein the terminal apparatus further comprises:
a receiver which receives the answer information and the apparatus information from the image processing apparatus; and
the hardware processor being configured to identify the target image processing apparatus based on the answer information and the apparatus information received by the receiver.

2. The image processing system as recited in claim 1, wherein the target identification operation selected by the hardware processor of the terminal apparatus corresponds to an operation of pressing a predetermined position of the image processing apparatus.

3. The image processing system as recited in claim 1, wherein the target identification operation selected by the hardware processor of the terminal apparatus corresponds to an operation of entering a predetermined string.

4. The image processing system as recited in claim 1, wherein the display of the terminal apparatus displays the target image processing apparatus identified by the hardware processor, in a distinct form allowing user to recognize easily.

5. The image processing system according to claim 1, wherein
the answer information transmitted by the transmitter identifies that the detector has detected that the operation corresponding to the target identification operation has been performed.

6. The image processing system according to claim 1, wherein when a plurality of jobs are input to the multiple image processing apparatuses, the hardware processor of the terminal apparatus is configured to select a unique target identification operation out of the plurality of target identification operations as the target identification operation for each job of the plurality of jobs.

7. A terminal apparatus being capable of connecting to multiple image processing apparatuses via a network, the terminal apparatus comprising:
a hardware processor configured to select a target identification operation proving the identity of a target image processing apparatus, so that the target image processing apparatus could be identified among the multiple image processing apparatuses, the target identification operation being selected out of a plurality of target identification operations, each of the plurality of target identification operations proving the identity of the target processing apparatus;
a display which displays information about the target identification operation determined by the hardware processor;
the hardware processor being configured to instruct the multiple image processing apparatuses to return answer information notifying that an operation corresponding to the target identification operation has been performed when they detect that this operation has been performed;
a receiver which receives the answer information and apparatus information proving the identities of the image processing apparatuses, from the image processing apparatuses; and
the hardware processor being configured to identify the target image processing apparatus based on the answer information and the apparatus information received by the receiver.

8. The terminal apparatus as recited in claim 7, wherein the target identification operation selected by the hardware processor corresponds to an operation of pressing a predetermined position of the image processing apparatus.

9. The terminal apparatus as recited in claim 7, wherein the target identification operation selected by the hardware processor corresponds to an operation of entering a predetermined string on the portable terminal.

10. The terminal apparatus as recited in claim 7, wherein the display of the terminal apparatus displays the target image processing apparatus identified by the hardware processor, in a distinct form allowing user to recognize easily.

11. The terminal apparatus according to claim 7, wherein when a plurality of jobs are input to the multiple image processing apparatuses, the hardware processor of the terminal apparatus is configured to select a unique target identification operation out of the plurality of target identification operations as the target identification operation for each job of the plurality of jobs.

12. An image processing apparatus identifying method being implemented by an image processing system comprising a terminal apparatus and multiple image processing apparatuses all being capable of connecting to each other via a network, the image processing apparatus identifying method comprising steps of the terminal apparatus and steps of each of the multiple image processing apparatuses;
the steps of the terminal apparatus comprising:
selecting a target identification operation proving the identity of a target image processing apparatus, so that the target image processing apparatus could be identified among the multiple image processing apparatuses, the target identification operation being selected out of a plurality of target identification operations, each of the plurality of target identification operations proving the identity of the target processing apparatus;
displaying information about the target identification operation determined; and
instructing the multiple image processing apparatuses to return answer information notifying that an operation corresponding to the target identification operation has been performed when they detect that this operation has been performed,
the steps of each of the multiple image processing apparatuses comprising:
detecting that the operation corresponding to the target identification operation has been performed; and
transmitting to the terminal apparatus, the answer information and apparatus information proving the identity of the image processing apparatus itself,
wherein the steps of the terminal apparatus further comprise
receiving the answer information and the apparatus information from the image processing apparatus; and
identifying the target image processing apparatus based on the answer information and the apparatus information received.

13. The method according to claim 12, wherein
the answer information transmitted to the terminal apparatus identifies that a detector has detected that the operation corresponding to the target identification operation has been performed.

14. The method according to claim 12, wherein when a plurality of jobs are input to the multiple image processing apparatuses, the selecting step of the terminal apparatus selects a unique target identification operation out of the plurality of target identification operations as the target identification operation for each job of the plurality of jobs.

15. A non-transitory computer-readable recording medium with an image processing apparatus identifying program being stored thereon to make a computer of a terminal apparatus being capable of connecting to multiple image processing apparatuses via a network, execute:
- selecting a target identification operation proving the identity of a target image processing apparatus, so that the target image processing apparatus could be identified among the multiple image processing apparatuses, the target identification operation being selected out of a plurality of target identification operations, each of the plurality of target identification operations proving the identity of the target processing apparatus;
- displaying information about the target identification operation determined;
- instructing the multiple image processing apparatuses to return answer information notifying that an operation corresponding to the target identification operation has been performed when they detect that this operation has been performed;
- receiving the answer information and the apparatus information from the image processing apparatus; and
- identifying the target image processing apparatus based on the answer information and the apparatus information received.

16. The non-transitory computer-readable recording medium with the image processing apparatus identifying program being stored thereon as recited in claim 15, wherein the selected target identification operation corresponds to an operation of pressing a predetermined position of the image processing apparatus.

17. The non-transitory computer-readable recording medium with the image processing apparatus identifying program being stored thereon as recited in claim 15, wherein the selected target identification operation corresponds to an operation of entering a predetermined string on the terminal apparatus.

18. The non-transitory computer-readable recording medium with the image processing apparatus identifying program being stored thereon as recited in claim 15, wherein the identified target image processing apparatus is displayed on the display of the terminal apparatus, in a distinct form allowing user to recognize easily.

19. The non-transitory computer-readable recording medium according to claim 15, wherein when a plurality of jobs are input to the multiple image processing apparatuses, the selecting step includes selecting a unique target identification operation out of the plurality of target identification operations as the target identification operation for each job of the plurality of jobs.

* * * * *